US011681949B2

(12) United States Patent
Silverstein et al.

(10) Patent No.: US 11,681,949 B2
(45) Date of Patent: Jun. 20, 2023

(54) POWER AWARENESS SYSTEMS AND PROCESSES

(71) Applicant: INTERNATIONAL BUSINESS MACHINES CORPORATION, Armonk, NY (US)

(72) Inventors: Zachary A. Silverstein, Jacksonville, FL (US); Sarbajit K. Rakshit, Kolkata (IN); Shawn Doolen, Edgewater, CO (US); Robert Huntington Grant, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 561 days.

(21) Appl. No.: 16/823,870

(22) Filed: Mar. 19, 2020

(65) Prior Publication Data

US 2021/0295206 A1    Sep. 23, 2021

(51) Int. Cl.
*G06F 3/16* (2006.01)
*G06N 20/00* (2019.01)
*G06F 16/2457* (2019.01)
*G06F 1/28* (2006.01)
*G06F 16/248* (2019.01)
*G10L 15/22* (2006.01)
(Continued)

(52) U.S. Cl.
CPC ............. *G06N 20/00* (2019.01); *G06F 1/28* (2013.01); *G06F 3/167* (2013.01); *G06F 16/248* (2019.01); *G06F 16/24575* (2019.01); *G06V 40/172* (2022.01); *G10L 15/1815* (2013.01); *G10L 15/22* (2013.01); *G10L 2015/223* (2013.01)

(58) Field of Classification Search
CPC .... G06F 16/24575; G06F 16/248; G06F 1/28; G06F 3/167; G06V 40/172; G10L 15/1815; G10L 15/22; G10L 2015/223
See application file for complete search history.

(56) References Cited

U.S. PATENT DOCUMENTS 8,150,475 B2  4/2012 Gilmore, II et al.
9,374,787 B2  6/2016 de Lind van Wijngaarden et al.
(Continued)

OTHER PUBLICATIONS

Mell et al., "The NIST Definition of Cloud Computing", NIST, Special Publication 800-145, Sep. 2011, 7 pages.
(Continued)

*Primary Examiner* — Robert J Michaud
(74) *Attorney, Agent, or Firm* — Maeve Carpenter; Andrew D. Wright; Calderon Safran & Cole P.C.

(57) ABSTRACT

A computer-implemented method includes: learning, by a computer device, a delivery for response content in view of types of queries; awakening, by the computer device, in response to receiving an activation command; receiving, by the computer device, a query; determining, by the computer device, a context of the query; determining, by the computer device, a digestibility of a response to the query; and determining, by the computing device, to output a response to the query as one of an audio response, a displayed response, and an audio response and a displayed response to the user, wherein the determining is based on the learning, the determined context of the query, the determined digestibility of the response, and the preferences of the user for receiving the response.

20 Claims, 7 Drawing Sheets

(51) Int. Cl.
    *G10L 15/18*     (2013.01)
    *G06V 40/16*     (2022.01)

(56) References Cited

U.S. PATENT DOCUMENTS

| | | |
|---|---|---|
| 9,811,133 B2 | 11/2017 | Cudak et al. |
| 9,851,775 B2 | 12/2017 | Kritt et al. |
| 9,936,458 B2 | 4/2018 | Chen et al. |
| 10,102,594 B2 | 10/2018 | Kritt et al. |
| 2008/0153452 A1 | 6/2008 | Huang et al. |
| 2012/0188067 A1 | 7/2012 | Xiao |
| 2014/0365790 A1* | 12/2014 | Chen .................... G06F 1/3212 713/300 |
| 2018/0307687 A1* | 10/2018 | Natkin ................ G06F 16/3329 |
| 2020/0134151 A1* | 4/2020 | Magi ....................... G06F 21/35 |

OTHER PUBLICATIONS

Brownlee, https://www.youtube.com/watch?v=JFiu5rfnhzo, "Google Assistant vs Siri! (2016)", Oct. 21, 2016, 1 page.

\* cited by examiner

POWER AWARENESS SYSTEMS AND PROCESSES

BACKGROUND

Aspects of the present invention relate generally to power savings and, more particularly, to power awareness systems and processes.

Current devices can respond to voice commands and execute actions with voice enabled artificial intelligence (AI), e.g., digital assistants. More specifically, a voice command is analyzed, and an action is taken by the digital assistant. In one example, the AI of a mobile device parses the user voice command and responds accordingly.

SUMMARY

In a first aspect of the invention, there is a computer-implemented method including: learning, by a computer device, a delivery for response content in view of types of queries; awakening, by the computer device, in response to receiving an activation command; receiving, by the computer device, a query; determining, by the computer device, a context of the query; determining, by the computer device, a digestibility of a response to the query; and determining, by the computing device, to output a response to the query as one of an audio response, a displayed response, and an audio response and a displayed response to the user, wherein the determining is based on the learning, the determined context of the query, the determined digestibility of the response, and the preferences of the user for receiving the response.

In another aspect of the invention, there is a computer program product including one or more computer readable storage media having program instructions collectively stored on the one or more computer readable storage media. The program instructions are executable to: receive a query; analyze the query for a context; determine a query type from the context; correlate a response content to the query type; analyze the response content for digestibility; determine preferences of a user for receiving the response content; determine whether an audio response or a displayed response should be delivered to the user based on the context of the query, the digestibility of the response content and the preferences of the user for receiving the response content; and deliver the audio response or the displayed response.

In another aspect of the invention, there is system including a processor, a computer readable memory, one or more computer readable storage media, and program instructions collectively stored on the one or more computer readable storage media. The program instructions are executable to: awaken a computing device to receive a query; receive the query at the computing device; analyze the query for a context; determine a query type from the context; correlate a response content to the query type; analyze the response content for digestibility; determine preferences of a user for receiving the response content; determine whether an audio response or a displayed response should be delivered to the user based on the context of the query, the digestibility of the response content, and the preferences of the user for receiving the response content; and deliver the audio response or the displayed response.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
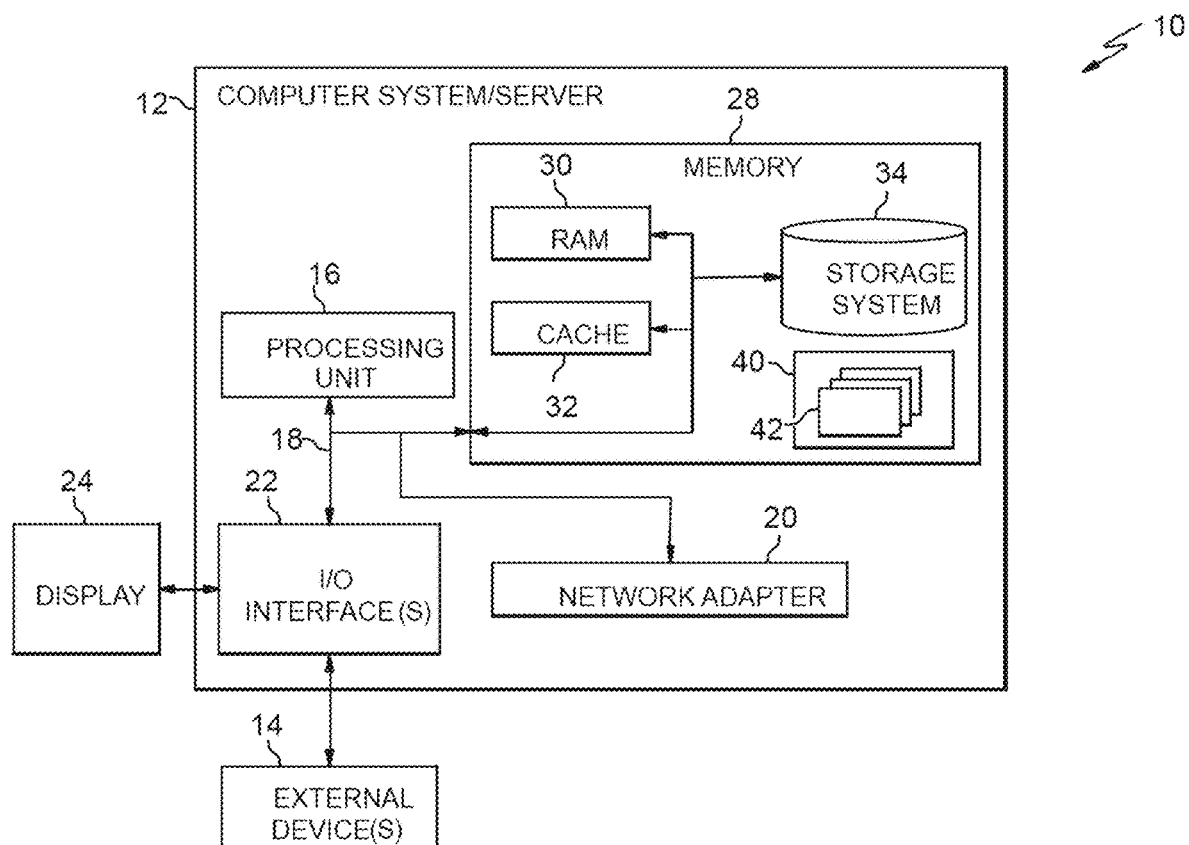
FIG. 1 depicts a cloud computing node according to an embodiment of the present invention.

Aspects of the present invention relate generally to power savings and, more particularly, to power awareness systems and processes. According to aspects of the invention, power savings are provided for a mobile computing device responding to user commands. More specifically, power savings are provided by identifying how a response should be delivered in view of the user command. In this way, aspects of the invention determine when to provide an audio response and/or a displayed response in order to provide power savings for the mobile computing device.

An artificial intelligence (AI) component of a mobile computing device may respond to a critical or complex user command with a voice response and/or a displayed response on a screen of the mobile computing device. However, duplicative, unnecessary and relatively lengthy responses waste energy. In one example, an initial question, command, clarification and/or response is documented visually on the display and duplicated in a voice response to the user. These duplicative actions waste energy for the mobile computing device. Accordingly, aspects of the invention avoid duplicative, unnecessary and relatively lengthy responses to provide power savings for the mobile computing device.

In embodiments, when answering the user's command, aspects of the invention identify if an audio response alone is sufficient, or if a displayed response should be delivered in addition to or instead of the audio response. By providing an audio only response, the mobile computing device achieves power savings because of a less amount of power being consumed when delivering an audio response compared to displaying a response on a screen of the mobile computing device, which consumes more power.

In embodiments, to provide power savings, aspects of the invention analyze: a) a current available battery power of the mobile computing device; b) a predicted need for battery power of the mobile computing device before a next recharge; c) a context with respect to the command; d) a digestibility of the response to the user; and e) location and/or positioning of the user with respect to the mobile computing device, amongst other features. Aspects of the invention use these features to decide if the audio response alone is sufficient. In this way, aspects of the invention augment a desired output based on various characteristics, e.g. current power/battery level of the mobile computing device.

In embodiments, a learning phase determines the preferences of the user for receiving the response. For example, the learning phase determines if a user prefers a displayed response, or if the entire conversation between the mobile computing device and the user needs to be displayed, amongst other examples. During the learning phase, the mobile computing device delivers both audio responses and displayed responses together. Over time, the learning phase determines a user's interaction pattern with respect to the audio responses and displayed responses. In embodiments, the user's interaction pattern includes capturing whether, in addition to receiving the audio response, the user views the displayed response on a screen of the mobile computing device.

In embodiments, the learning phase continues by determining interaction patterns between the user and the mobile computing device to determine if the response should be displayed to the user. Aspects of the invention cluster these interaction patterns based on relevancy scores built on the history of the interaction patterns. Accordingly, by analyzing the historical interaction patterns, the systems and processes described herein identify which response needs to be displayed on the screen and for which response an audio response alone is sufficient.

As the learning phase progresses over time, a knowledge corpus of preferences matures. Once the knowledge corpus matures, then, when the user submits a voice request/query (command) to the mobile computing device, aspects of the invention determine the preferred delivery method for the user.

In embodiments, if a response should be displayed, aspects of the invention determine an alternative delivery when there is insufficient battery power for the mobile computing device. In one example, in view of the insufficient battery power, aspects of the invention process the user's request/query (command) and display the response content on another display of a paired computing device near the user which has sufficient power to display the response. In this way, aspects of the invention divide a response across multiple connected computing devices, with an audio response provided on one computing device and a displayed response provided on another computing device based on battery power availability of the computing devices and positioning of the computing devices with respect to the user. In one example, aspects of the invention display a response on a TV screen near a user instead of a mobile phone with a smaller display and a relatively less amount of power, or display a response on a smart watch instead of a mobile phone located across the room from the user. Additionally, if there is insufficient battery power for the mobile computing device, or if the battery power is insufficient for predicted response needs, aspects of the invention identify if the content of the audio response is comparatively simple with respect to the user based on the historical learning. More specifically, if the battery power is insufficient and the content is non-digestible or non-valuable for consumption by the user through audio delivery, the systems and processes earmark the interaction to display the response content to the user.

In embodiments, aspects of the invention determine a user's location by analyzing various parameters. In one example, the mobile computing device communicates with surrounding internet of things (IoT) devices to obtain location feeds with respect to the user. More specifically, the IoT devices within a proximity of a user capture images of the user through cameras to supply location information of the user through the location feeds. In embodiments, aspects of the invention also analyze a loudness of the user's voice and/or a user's facial direction towards a display of the mobile computing device to identify the user's relative location and/or position with respect to the mobile computing device. In one example, the systems and processes use volume detection to determine if the user is near the mobile computing device to view a displayed response. In another example, the systems and processes use the cameras of computing devices within a proximity of the user for facial recognition to determine if the user is looking at the mobile computing device.

Accordingly, when a user submits a command to the mobile computing device, the systems and processes analyze the user's location from the IoT feeds, the intensity of the user's voice, the user's facial direction towards a display of a computing device, a user's relative distance with respect to a computing device and a position of eye focus with respect to the display of a computing device. In view of the user's location and position, aspects of the invention determine how to display the response content to the user. In embodiments, if an audio response is sufficient and consumable through auditory delivery and no further interaction from the user is expected, the mobile computing device does not awake and/or does not display a full user interface (UI) and/or the response.

In embodiments, the systems and processes described herein also provide power savings by reducing a complexity of the response. In one example, power savings occurs by reducing the response to a subset of shortened predetermined responses which consume a lower amount of power compared to a lengthier non-predetermined response. In embodiments, natural language understanding (NLU) determines if a reduction of the response should be performed. As an example, instead of responding with a voice response of "Alarm set for 8 AM," aspects of the invention respond with a shortened predetermined response of "Set" as an audio response. In this way, aspects of the invention understand when an acknowledgement is unnecessary and a shortened predetermined response can be delivered instead.

Embodiments of the present disclosure include a method for determining a digital assistant response based on device power/battery level, with the method including the step of receiving a voice command by a mobile computing device. In embodiments, the method includes the step of determining power/battery information pertaining to the mobile computing device, including: (i) a current power/battery level of the mobile computing device, and (ii) a predicted need of power/battery of the mobile computing device before a next recharge. Additionally, the method includes the step of determining a response to the voice command based, at least in part, on the determined power/battery information. In embodiments, the method includes determining the response to the voice command, which includes determining whether to answer the voice command on a display of the mobile computing device or via audio notification only. In embodiments, the step of determining whether to answer the voice command on the display of the mobile computing device or via audio notification only is further based, in part, on a length of the answer and a predicted level of understandability of the answer.

Implementations of the invention allow for improvements to a functioning of a computer by reducing computer power consumption. In embodiments, aspects of the invention provide power savings by eliminating duplicative, unnecessary and/or lengthy responses when answering a user's command. In one example, power savings occurs by determining when an audio response is sufficient, and/or when a displayed response is needed. In another example, power savings occurs by offloading a displayed response from a device having relatively low power to a device having a relatively higher amount of power. In this way, the systems and processes described herein provide the practical application of determining when a relatively less power consuming audio response can be provided or when a relatively more power consuming displayed response should be provided in view of the user's command. Further, the systems and processes described herein provide the practical application of offloading a current task, e.g., displaying a response, from a low battery power device to a higher battery power device by finding other devices for content offloading. In embodiments, power savings also occurs by reducing a complexity of the response and/or providing a shortened predetermined response. In one example, if a computing device has relatively low battery power and should not display a response, aspects of the invention modify the response content to allow for power savings while providing content which is digestible to the user. In one example, a predetermined response which consumes less power is provided to the user. In this way, the systems and processes provide the practical application of modifying an interaction between the user and the computing device based on power awareness of the computing device. Accordingly, power savings provided herein enables the practical application of extending a usefulness of a computing device without interruption due to insufficient power.

In addition, the steps for power savings are unconventional. In embodiments, in response to receiving a command at a computing device, aspects of the invention implement steps to analyze: a) a current available battery power of the mobile computing device; b) a predicted need for battery power of the mobile computing device before a next recharge; c) a context with respect to the command; d) a digestibility of the response to the user; and e) location and/or positioning of the user with respect to the mobile computing device, amongst other steps. In view of this arrangement of steps, the systems and processes decide if a response needs to be displayed in a screen of the computing device or if a voice only response is sufficient. In embodiments, further steps include reducing a complexity of a response to a predetermined response to provide power savings. Accordingly, the unconventional arrangement of steps disclosed herein allow for power consumption to be reduced on the computing device, thereby providing a solution to the technological problem of device interruption because of inefficient or low power.

It should be understood that, to the extent implementations of the invention collect, store, or employ personal information provided by, or obtained from, individuals (for example, commands submitted by a user to a computing device), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
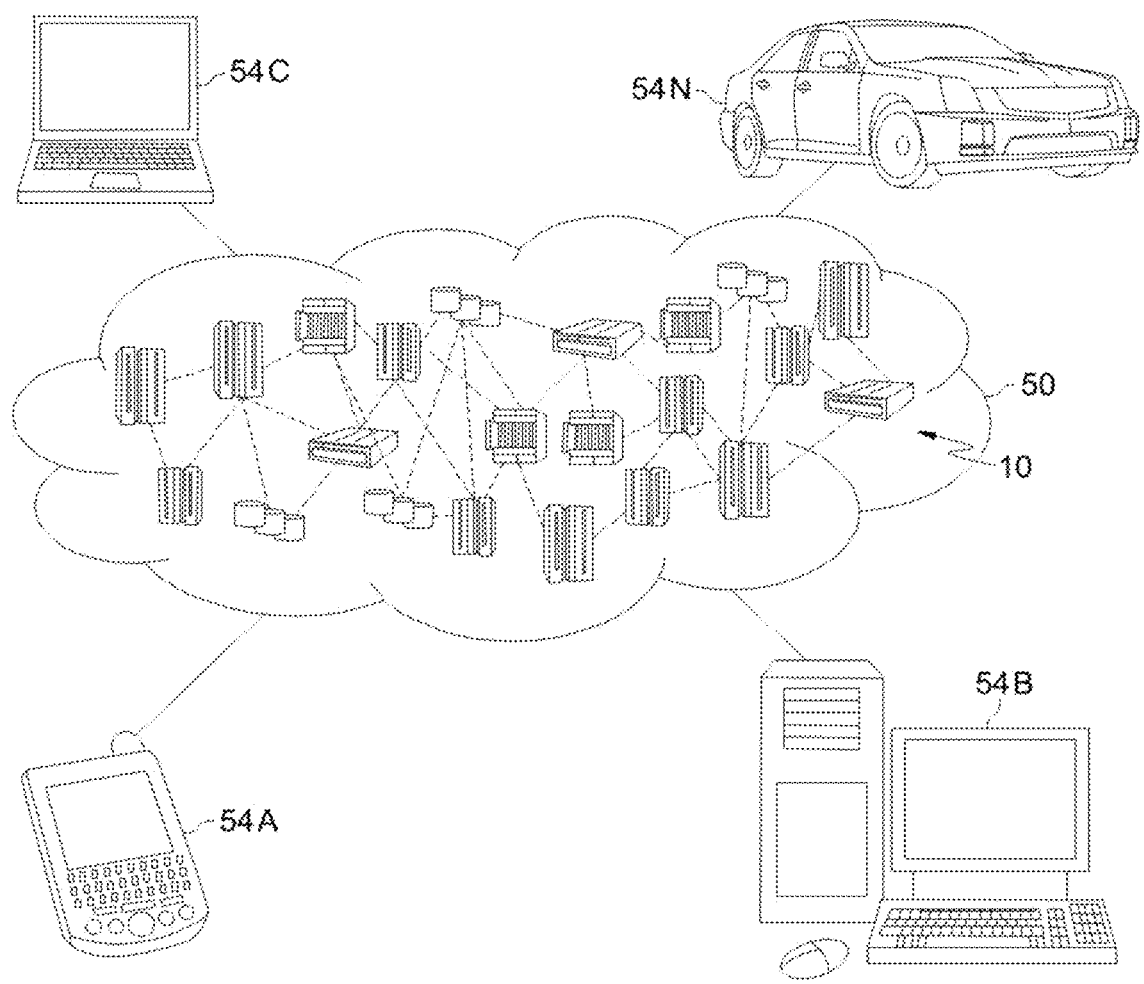
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
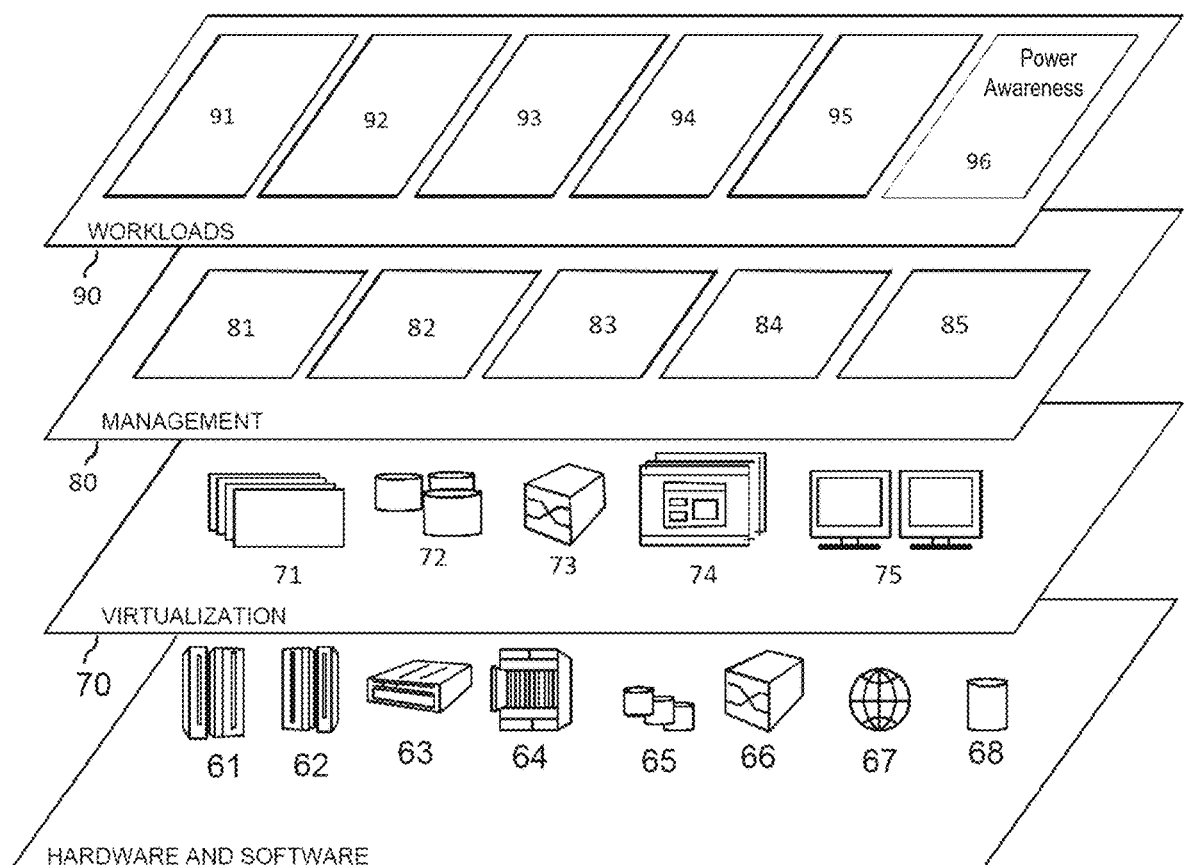
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power awareness 96.

Implementations of the invention may include a computer system/server 12 of FIG. 1 in which one or more of the program modules 42 are configured to perform (or cause the computer system/server 12 to perform) one of more functions for the power awareness 96 of FIG. 3. For example, the one or more of the program modules 42 may be configured to: analyze a current available battery power of a mobile computing device; analyze a predicted need for battery power of the mobile computing device before a next recharge; analyze a context with respect to a response content to understand a level of complexity of the response with respect to a user's level of understandability; analyze various IoT feeds from IoT devices within a proximity of the user; analyze an intensity of a voice of the user to understand a user's relative location; analyze a user's facial direction towards a display of a computing device to understand a user's relative position; analyze eye focus of the user with respect to the display of the computing device to understand a user's relative position; and reduce a complexity of a response to a predetermined response to provide power savings.

Figure 4:
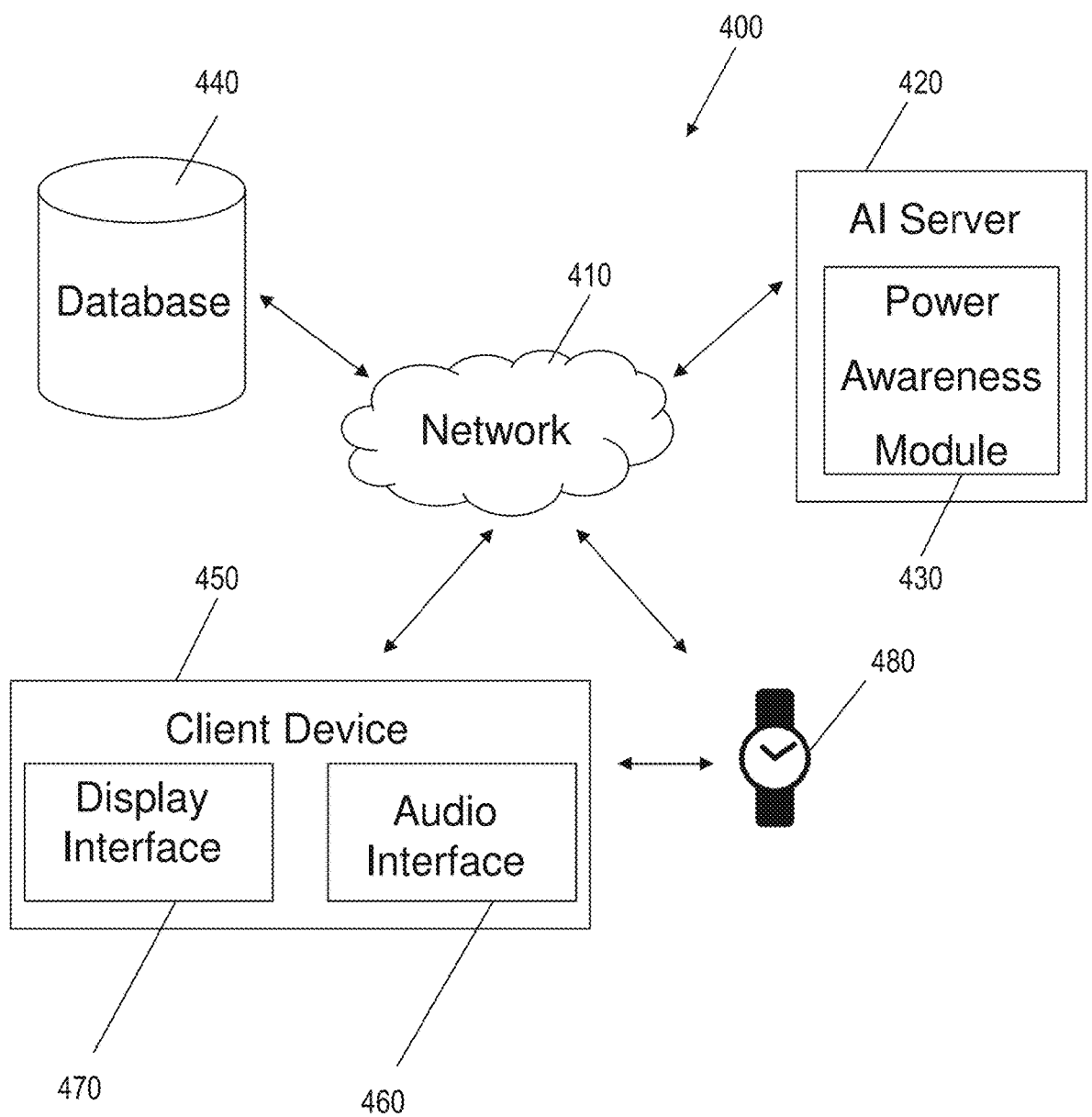
FIG. 4 shows a block diagram of an exemplary environment in accordance with aspects of the invention.

FIG. 4 shows a block diagram of an exemplary environment 400 in accordance with aspects of the invention. In embodiments, the environment 400 includes network 410, artificial intelligence (AI) server 420, database 440, client device 450 and alternate computing device 480. The AI server 420 comprises a power awareness module 430, which comprises one or more program modules such as program modules 42 described with respect to FIG. 1. In embodiments, the AI server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 is representative of a cloud network as described in FIG. 2. The client device 450 is a mobile computing device, e.g., smartphone, smartwatch, tablet, laptop, etc., and includes one or more components of the computer system 12 of FIG. 1. In embodiments, the client device 450 receives a query from a user and responds to the query in view of certain factors. In embodiments, the process begins with the client device 450 in an attentive state and ready for activation by a request. In one example, the client device 450 is in a "listen mode" or other attentive mode. The client device 450 receives the activation command either audibly through an audio interface 460 and/or manually through a display interface 470. In one example, the audio interface 460 is a microphone, while the display interface 470 is a touch screen of the client device.

Upon receipt of the activation command, the client device 450 is in a full powered state. Alternatively, the client device 450 starts in a full powered state, ready to begin the processes of the present disclosure. In embodiments, the client device 450 receives a query from the user, either through the audio interface 460 and/or the display interface 470. In one example, the user speaks the query to the microphone of the client device 450. Alternatively, the user manually enters the query through the touch screen of the display interface 470. Non-limiting examples of queries include a request to call a contact, a request for directions, a query for the current time, a query for the current weather, etc.

In embodiments, the power awareness module 430 analyzes the query received from the user and determines how a response should be delivered in view of various features. In one example, the power awareness module 430 receives the query through the network 410 for processing. Upon receipt of the query, the power awareness module 430 analyzes a context of the query to determine the type of query received. In embodiments, a natural language classifier (NLC) program residing within the power awareness module 430 performs the context analysis.

In embodiments, the NLC program allows for text within the query to be classified into categories by comparing the text to classification models. In one example, the comparison of the text occurs through multiple support vector machine (SVM) models which compare the text to predefined classification categories stored in the database 440 to determine one or more classification categories for the query. In view of the determined categories, aspects of the invention understand the type of query received. In one example, the power awareness module 430 determines whether the query is a request or other command type in view of how the text of the query is classified. In one example, the power awareness module 430 determines that the query is a request for a calendar event since the text of the query is classified into categories for a future time, a future date and a location, which indicates that this query is a request for a calendar event. In another example, the power awareness module 430 determines that the query is a request for the current time since the text of the query is classified into categories for a current time.

In embodiments, the database 440 contains responses which correlate to the query type. Accordingly, by knowing the query type, the power awareness module 430 determines the response content which correlates for that command type. For example, the power awareness module 430 determines that the query is a request for a calendar event in view of the query text to classification, and that the response content includes an acknowledgement that the calendar event has been set because an acknowledgement response correlates to a calendar event request. In another example, the power awareness module 430 determines that the query is a request for the current weather. Accordingly, the power awareness module 430 determines the response content includes a status of the weather because the status of the weather response correlates to a weather query.

In view of the determined response content, the power awareness module 430 continues with machine learning techniques to establish a digestibility of the response content. In embodiments, digestibility includes a level of ease for the user in understanding the response content, and a level of value (worthwhileness) of the response content to the user. In embodiments, a natural language processing (NLP) program residing within the power awareness module 430 analyzes digestibility. In embodiments, the NLP program includes computational linguistics for parsing and interpreting the text, allowing the power awareness module 430 to learn, analyze and understand the language within the response content.

In embodiments, aspects of the invention determine digestibility by generating digestibility scores for the response content. More specifically, the NLP program determines a readability of the response content. Assigning the digestibility scores includes assigning the digestibility scores as a high digestibility or as a low digestibility. For example, aspects of the invention assign a high digestibility score to a response having content at a lower complexity level, while assigning a low digestibility score to a response having content at a higher complexity level. In this way, high digestibility represents response content having an easier comprehension level for the user.

In one example, the user requests a calendar event for a doctor's appointment at a specific time, date and place. A digestible response for this request is a response having an acknowledgment that the calendar event has been created. This acknowledgment response is relatively easy for the user to understand since it is relatively short. Further, this acknowledgment response is also valuable to the user because it notifies the user that the calendar event has been created without further information confusing the user. An example of an indigestible response is response having content which repeats back the specific time, the date and the place of the appointment. In this example, the response is not as easy for the user to understand compared to the previous example because of the increased length of the response. Further, this response is not as valuable to the user since it provides the user information which is currently not needed by the user.

In embodiments, the power awareness module 430 implements a learning phase to develop a knowledge corpus for the appropriate response delivery. During the learning phase, the power awareness module 430 delivers both audio responses and displayed responses together in the interfaces 460, 470 in view of the determined query context and the determined digestibility. Over time, the learning phase determines a user's interaction pattern with the client device 450 with respect to the audio responses and displayed responses.

In embodiments, the capturing of the user's interaction pattern includes determining whether, in addition to receiving the audio response, the user views the displayed response on the display interface 470. In one example, the client device 450 is a smartphone and the camera of the smartphone captures the user's interaction pattern by taking images of the user looking at the display interface 470. In view of the captured images, the learning phase learns that the user looks at the display interface 470 for that response content. Aspects of the invention store these interaction patterns in database 440.

An exemplary use-case is described to illustrate aspects of the learning phase in accordance with embodiments of the invention. In the use-case, the AI server 420 receives 1000 queries from the user over a time period during the learning phase. As an example, out of these 1000 queries, 400 queries were regarding the current weather, 375 queries were regarding directions to a location and 225 queries were regarding the current time. The power awareness module 430 of the AI server 420 learns that in 395 responses out of 400 responses to the 400 queries regarding the current weather, the user did not look at the display interface 470 for the response content. Accordingly, the power awareness module 430 learns that for this type of query (e.g., weather) the user prefers receiving the audio response instead of viewing a displayed response on the display interface 470. In another example, the power awareness module 430 learns that for 375 responses to the 375 queries regarding directions to a location, the user looked at the display interface 470 for the response content. Accordingly, the power awareness module 430 learns the user's preferred delivery is a displayed response for certain types of queries. In another example, the power awareness module 430 learns that for 225 responses to the 225 queries regarding the current time, the user did not look at the display interface 470 for the response content. Accordingly, the power awareness module 430 learns the user's preferred delivery is an audio response for other types of queries.

In embodiments, the power awareness module 430 clusters these interaction patterns based on relevancy between the interaction patterns. Specifically, the clustering involves clustering certain interactions together in view of the request or query. For example, aspects of the invention cluster queries for current conditions, e.g., weather, time, etc., together because of relevancy for audio only responses. In another example, the learning phase learns that a request to shut off a device should be clustered together with other interactions responding to requests for devices. Further, the learning phase learns from the clustering of these interactions that the user did not view the display interface 470 for all requests for devices. In this way, the learning phase determines when a response should be delivered audibly or when a response should be displayed based on the clustering of the interactions.

As the learning phase progresses over time with examples of how a user interacts with the client device 450 when receiving the audio response and the displayed response, the knowledge corpus of the power awareness module 430 matures by understanding how the user prefers the response to be delivered for different types of queries. In embodiments, maturing of the knowledge corpus represents an increasing accuracy for understanding the user's preferences for response delivery.

In embodiments, the power awareness module 430 also learns during the learning phase the power characteristics of the client device 450 by analyzing a current level of the current available battery power of the client device 450 and analyzing a predicted need for battery power of the client device 450 before a next recharge. In one example, the power awareness module 430 learns over time anticipated power needs for the client device 450 by learning the power consumption behaviors of response to queries. In one example, the power awareness module 430 learns that 100 queries for the current weather occurs at the same time every day over a period of time. In embodiments, during each query of the 100 queries for the current weather, the power awareness module 430 determines the current available battery power of the client device 450 and how much power is consumed when delivering the response content for the current weather. Accordingly, the power awareness module 430 learns over time an amount of power consumed when delivering the audio response through the audio interface 460 and/or the amount of power consumed when delivering the displayed response through the display interface 470. In this way, the power awareness module 430 learns to predict the power consumption of the client device 450 for different types of queries.

In embodiments, the power awareness module also learns the charging habits for the client device 450. For example, the power awareness module 430 learns that the client device 450 is connected to a power cable for charging at certain times. For example, the power awareness module 430 can access the current location of the user and determine that a charge is forthcoming because of the historical instances of charging when the user is home in the evening. In this way, the learning phase learns the power characteristics of the client device 450 by learning how much power is needed for delivering a response and when the client device 450 will be charged.

In embodiments, when receiving a query from the user, the power awareness module 430 validates a current level of battery power. In this way, the power awareness module determines how much power is available for displaying the response. Accordingly, in view of the current available battery power, the anticipated power consumption of the response delivery and the anticipated charging of the client device, the power awareness module determines the power characteristics of the client device 450.

In embodiments, in view of the query type, the response content digestibility and the historical interaction patterns, the power awareness module 430 determines whether an audio response alone is adequate for delivery. If the power awareness module 430 determines that an audio response is adequate, the power awareness module 430 determines next if a complexity of the response content of the audio response needs to be reduced. In embodiments, the power awareness module 430 can determine if the complexity should be reduced in view of the query type, the response content digestibility and the power characteristics of the client device 450. In one example, the power awareness module 430 understands that the query type is a request for a calendar event at a specific time, date and location. In view of the current available battery power of the client device 450, the digestibility of the response content and the historical interaction pattern, the power awareness module 430 determines to deliver an audible acknowledgment response. In a further example, if the battery power of the client device 450 is at a low level, e.g., at a threshold below 50% of total battery power, and/or if the digestibility of the response is not easy to understand and of no value to the user, the power awareness module 430 reduces the complexity of the audio response to a predetermined response to provide power savings. For example, instead of providing the audio response of "Alarm set for 8 AM," the audio response instead simply states "set" as the predetermined response.

If the power awareness module 430 determines that a displayed response should be delivered, aspects of the invention use the power characteristics of the client device 450 to determine if delivery of the displayed response should occur on the display interface or another device. In one example, if the current available power of the client device 450 is over a threshold of 50% of total battery power, the power awareness module 430 displays the response content on the display interface 470 of the client device 450. Alternatively, if the current available power of the client device is below the threshold of available battery power, the power awareness module coordinates with an alternate computing device 480 to display the response content.

In embodiments, the client device 450 and/or the alternate computing device 480 is within a proximity of the user so that the user can receive the response content from the client device 450 and/or the alternate computing device 480. In embodiments, a proximity between the user and the client device 450 or the user and the alternate computing device 480 is a location of the user in which an audible user query from the user is able to be received by the client device 450 and/or the alternate computing device 480. In further embodiments, the proximity is a location of the user in which a camera of the client device 450 and/or the alternate computing device 480 captures the user. In this way, aspects of the invention determine the proximity of the user with respect to the client device 450 and/or the alternate computing device by volume detection or by captured images of the user.

In embodiments, the alternate computing device 480 is a smartphone, smartwatch, tablet, laptop, etc., or other mobile computing device. In one example, the alternate computing device 480 is one or more Internet of things (IoT) devices within the proximity of the client device 450 and/or the user. If the power awareness module 430 determines that the client device 450 has sufficient power, i.e., the current available battery power is above a threshold, the power awareness module 430 determines the location and/or the position of the user with respect to the client device 450 to determine if the user can view the displayed response on the display interface 470.

In embodiments, the power awareness module 430 obtains IoT feeds with respect to the location of the user from IoT devices within the proximity of a user. In one example, the IOT devices capture images of the user through cameras within the device to supply location information of the user through the IoT feeds. In a further example, the power awareness module 430 uses the captured images to determine the user's position with respect to the alternate computing device 480. In embodiments, the user's location is a distance/proximity with respect to the client device 450 or the alternate computing device 480. In further embodiments, the user's position is a user's bodily position, e.g., facial orientation, with respect to the client device 450 and/or the alternate computing device 480. In this way, the IoT devices analyze a loudness of the user's voice to identify the user's location and/or analyze a user's position towards a display of the alternate computing device 480 to identify the user's position with respect to the client device 450 and/or the alternate computing device 480. In embodiments, the loudness of the user's voice can be analyzed through volume detection techniques. In embodiments, the user's position can be determined through facial analysis techniques. In one example, the facial analysis techniques determined a position of the using by analyzing the user's eye focus with respect to the client device 450 or the alternate computing device 480. Accordingly, when a user submits a query to the client device 450, the power awareness module analyzes the user's location from the IoT feeds, the intensity of the user's voice, the user's position with respect to the alternate computing device 480, the user's distance with respect to the alternate computing device 480 and a bodily position of the user. In one example, aspects of the invention determine the bodily position of the user from eye focus of the user with respect to a display of the alternate computing device 480 in determining if a response should be displayed on the alternate computing device 480. In this way, aspects of the invention determine how to display the response content in view of not only the power characteristics of the client device 450, but also the location and/or position of the user.

Figure 5:
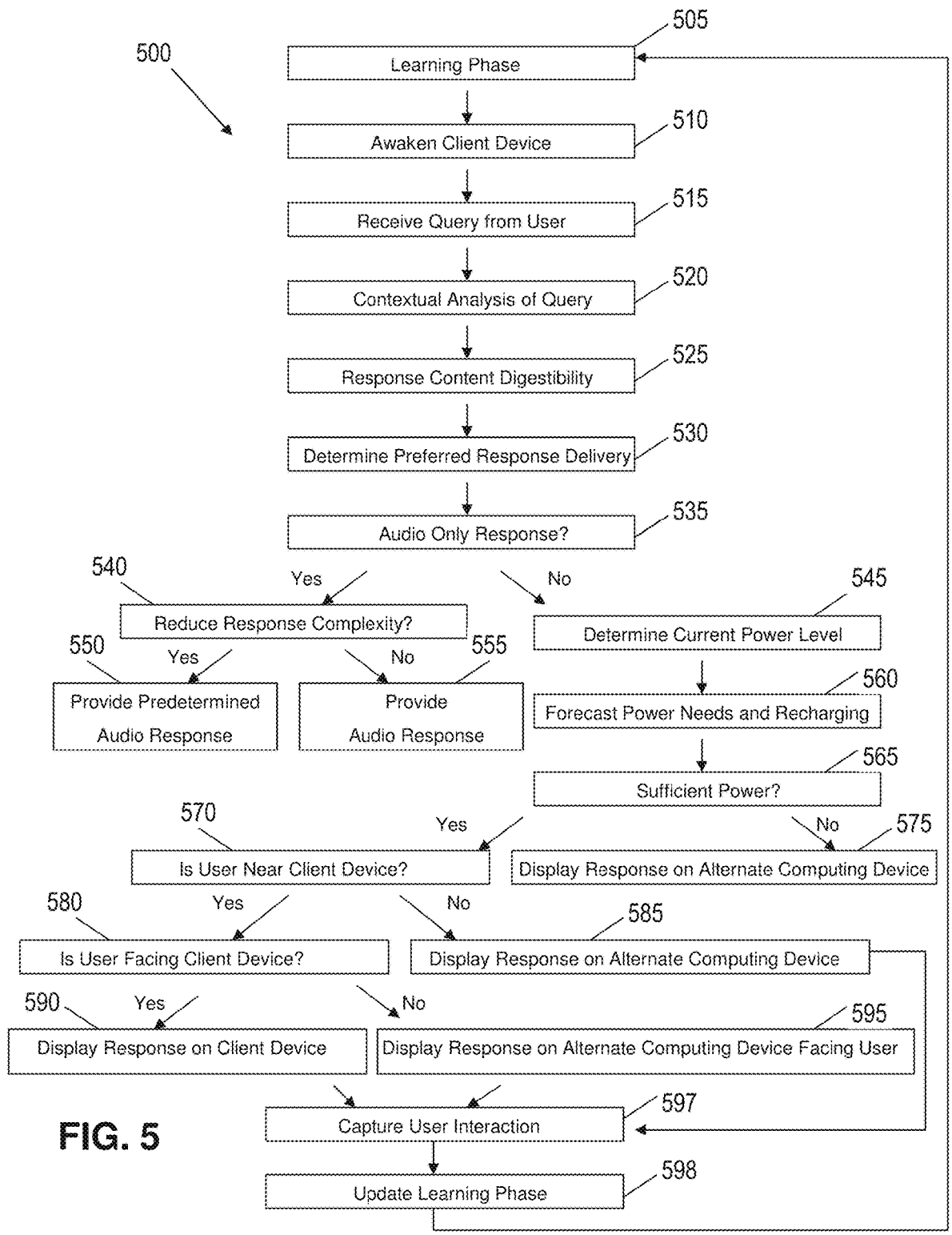
FIG. 5 shows a flowchart of an exemplary method in accordance with aspects of the invention.

FIG. 5 shows a flowchart 500 of an exemplary method in accordance with aspects of the present invention. Steps of the method may be carried out in the environment of FIG. 4 and are described with reference to elements depicted in FIG. 4. At step 505, the system implements the learning phase to determine how the user prefers to receive the response content. In embodiments, and as described with respect to FIG. 4, the power awareness module 430 delivers an audio response and a displayed response through the client device 450 in response to a query, and determines the user's interaction patterns with respect to the audio response and the displayed response. The power awareness module 430 clusters these interaction patterns based on relevancy and determines how the user prefers to receive the response content.

In embodiments, at step 510, the client device 450 is in an attentive mode or other low power mode waiting to be awakened by the user. Once awakened, the client device 450 is in a full powered state. In embodiments, the client device 450 awakens in response to receiving the activation command from the user, which is delivered by the user either audibly and/or manually to the client device 450. Upon receipt of the activation command, the client device 450 is ready to receive queries from the user.

At step 515, the client device 450 receives the query from the user and sends the query to the power awareness module 430 through the network 410 for processing. In one example, the query is a request for the current weather. At step 520, the power awareness module 430 processes the query by performing a context analysis of the query to determine the type of query received. In embodiments and as described with respect to FIG. 4, the context analysis occurs through NLC techniques. In view of the query type, aspects of the invention determine that the response content which correlates to that query type.

At step 525, the power awareness module 430 utilizes NLP to establish a digestibility of the response content. In embodiments, and as described with respect to FIG. 4, response content digestibility includes a level of ease for the user in understanding the response content, and a level of value (worthwhileness) of the response content to the user. In one example, the power awareness module 430 assigns digestibility scores to the response content representing how digestible the response content is.

At step 530, the power awareness module 430 determines the preferred response delivery for the response content in view of the learning phase at step 505, the contextual analysis of the query at step 520 and the response content digestibility of step 525. In embodiments, and as described with respect to FIG. 4, determining the preferred response delivery includes determining whether an audio response alone is adequate for delivery, or if a displayed response should be delivered in addition to or instead of the audio response. In embodiments, at step 535, if the power awareness module 430 determines only an audio response should be delivered the processes described herein move onto step 540 to determine if the response complexity should be reduced. In embodiments, determining to reduce the complexity of the response includes determining whether to shorten the length of the audio response content. If that the response complexity needs reducing, the power awareness module 430 at step 550 reduces the complexity of the response by providing a predetermined audio response. Alternatively, if the response complexity should not be reduced, the power awareness module provides the non-reduced audio response through the audio interface 460 at step 555.

At step 545, aspects of the invention determine the current power level of the client device 450. In embodiments, and as described with respect to FIG. 4, the current power level indicates a current available amount of battery power. At step 560, the power awareness module 430 predicts power needs for delivering the response and predicted recharging of the client device 450. In embodiments, the power awareness module 430 determines how much power will be consumed by delivering the response and when the next recharge of the client device will occur. In view of the current power level and the forecast power needs and recharging, aspects of the invention determine if the client device has sufficient power at step 565.

At step 570, when the client device 450 has sufficient power, e.g., above a threshold of 50% of total battery power, the power awareness module 430 determines if the user is near the client device 450. In embodiments, the power awareness module 430 determines a user's location and/or position from IoT feeds obtained from IoT devices within a proximity of the user. Alternatively, if the user is not near the client device 450, at step 575 the power awareness 430 delivers the response on a connected device, i.e., the alternate computing device 480.

In the event the power awareness module 430 determines that the user is near the client device 450 at step 570, then at step 580 the power awareness module 430 determines if the user is facing the client device 450 from the IoT feeds received from the client device. In view of the user being near the client device, at step 590 the power awareness module displays the response content on the display interface 470 of the client device 450.

In the event the power awareness module 430 determines at step 570 that the user is not near the client device, then at step 585, the power awareness module 430 displays the response content on an alternate computing device within a proximity of the user. In embodiments, and as described with respect to FIG. 4, if the power awareness module determines the user is near the device but is not facing the device, the power awareness module determines if the user is facing an alternate computing device 480. At step 597, the system captures the user's interaction with the displayed response and updates the learning phase of step 505. In view of the steps 510-597, the learning phase is updated at 598.

Figure 6:
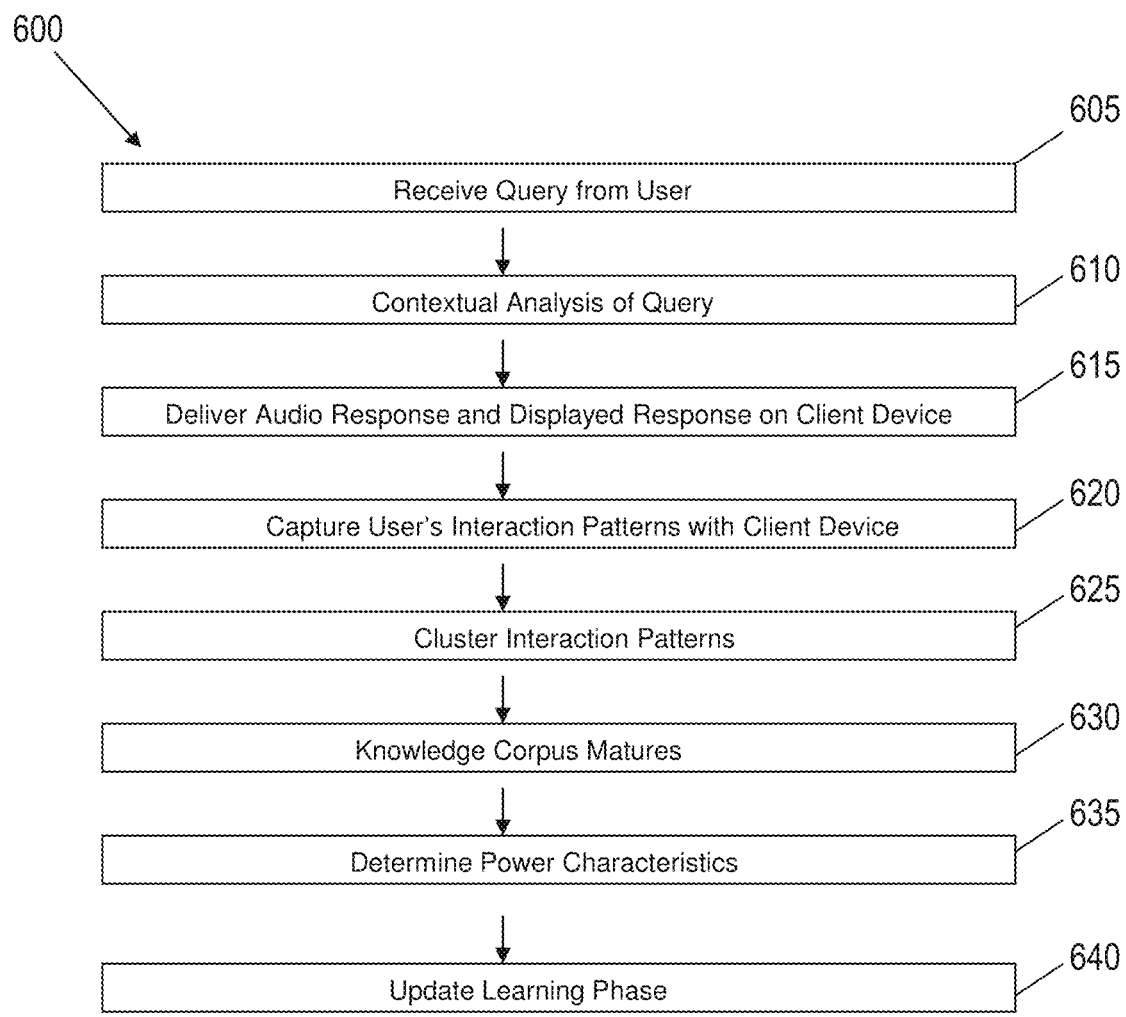
FIG. 6 shows a flowchart of an exemplary method for a learning phase in accordance with aspects of the invention.

FIG. 6 shows a flowchart 600 of an exemplary learning phase in accordance with aspects of the present invention. At step 605, the power awareness module 430 receives a query from the user. In embodiments, the query is a request from the user, e.g., a request for the current weather conditions. At step 610, the power awareness module 430 performs a contextual analysis of the query utilizing an NLC program.

At step 615, the power awareness module 430 delivers the audio response through the audio interface 460 and the displayed response through the display interface 470 of the client device 450. At step 620, the system captures the user's interaction with the audio response and the displayed response. In embodiments, the camera of the client device 450 captures the user's interaction with the audio response and/or the displayed response.

At step 625, the power awareness module 430 clusters the user's interaction patterns to determine the user's preferred delivery of response content. In embodiments, the interaction patterns are clustered based on relevancy. At step 630, the knowledge corpus of the power awareness module 430 matures by increasing an accuracy for understanding the user's preference for delivering the response content. At step 635, the power awareness module 430 determines the power characteristics of the client device 450. In embodiments, the power characteristics include a current level of the current available battery power of the client device 450, a predicted need for battery power of the client device 450 before a next recharge and the charging habits for the client device 450. At step 640, aspects of the invention update the learning phase in view of steps 605-635.

Figure 7A:
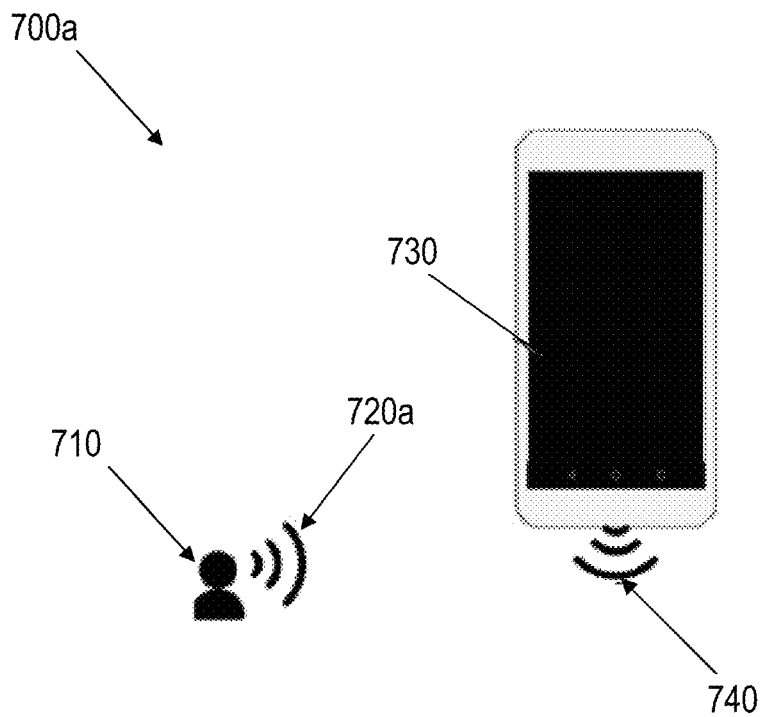
FIGS. 7A and 7B show exemplary scenarios of power awareness in accordance with aspects of the invention.
Figure 7B:
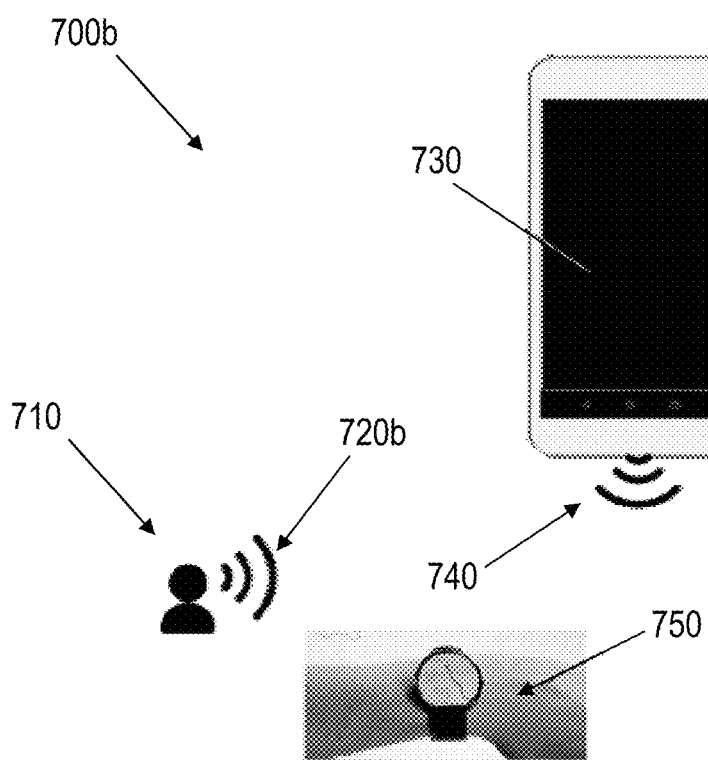

FIG. 7 illustrates a first scenario 700a and a second scenario 700b in accordance with aspects of the invention. In the first scenario 700a, the user 710 issues a query 720a to the mobile computing device 730. In one example, the query 720a is a request to call a contact. In this scenario 700a, the current available power of the mobile computing device 730 is low, i.e., below a battery power threshold. In embodiments, due to the low power and the query type being a request, aspects of the invention provide a shortened audible response compared to a full response indicating that the contact is being called, i.e., "Calling Larry." In one example, the shortened response is "Calling."

In a second scenario 700b, the user 710 submits a query 720b asking for the current weather outside. In this scenario 700b, the current available power of the mobile computing device 730 is low, e.g., below 50% of total battery power. However, because the power awareness module 430 determined the response should be displayed to the user, aspects of the invention display the response content on the smart device 750.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    learning, by a computer device, a delivery for response content in view of types of queries;
    awakening, by the computer device, in response to receiving an activation command;
    receiving, by the computer device, a query;
    determining, by the computer device, a context of the query;
    determining, by the computer device, a digestibility of a response to the query; and
    determining, by the computing device, to output a response to the query as an audio response and a displayed response to the user, wherein the determining is based on the learning, the determined context of the query, the determined digestibility of the response, and preferences of the user for receiving the response;
    determining, by the computer device, a current power level of the computer device is below a power threshold; and
    in response to determining the current power level of the computer device is below the power threshold, outputting the audio response by the computer device and causing an alternate computer device to display the displayed response.

2. The method of claim 1, further comprising reducing, by the computer device, a complexity of response content within the audio response.

3. The method of claim 2, wherein the reducing the complexity of the response content includes providing a predetermined audio response.

4. The method of claim 1, further comprising determining, by the computer device, power characteristics of the computer device.

5. The method of claim 4, wherein the power characteristics include the current power level of the computer device and a forecasted recharging of the computer device.

6. The method of claim 1, further comprising determining, by the computer device, a location of the user with respect to the computer device.

7. The method of claim 6, wherein the determining the location of the user with respect to the computer device includes analyzing images of the user captured by the computer device.

8. The method of claim 6, further comprising determining, by the computer device, a position of the user with respect to the computer device.

9. The method of claim 8, wherein the determining the position of the user with respect to the computer device includes analyzing images of the user captured by the computer device by facial recognition.

10. The method of claim 9, further comprising determining the alternate computer device is within a proximity of the user, wherein the causing the alternate computer device to display the displayed response is based on the determining the alternate computer device is within a proximity of the user.

11. A computer program product comprising one or more computer readable storage media having program instructions collectively stored on the one or more computer readable storage media, the program instructions executable to:
output both a first type of response and a second type of response for each query of plural queries during a learning phase, wherein the first type of response comprises an audio response and the second type of response comprises a displayed response;
determine user interaction patterns with the first type of response and the second type of response during the learning phase;
based on the determined user interaction patterns, determine user preferences including that the user prefers the first type of response for a first query type and that the user prefers the second type of response for a second query type;
receive a new query;
analyze the new query for a context;
determine a query type of the new query from the context;
correlate a response content to the query type;
in response to the query type of the new query being the first query type and based on the user preferences, delivering only an audio response for the new query; and
in response to the query type of the new query being the first query type and based on the user preferences, delivering only a displayed response for the new query.

12. The computer program product of claim 11, wherein the program instructions are executable to reduce a complexity of the response content.

13. The computer program product of claim 11, wherein the program instructions are executable to:
determine a current power level of the computing device is below a power threshold; and
in response to determining the current power level of the computing device is below the power threshold, causing the displayed response to be displayed on an alternate computer device.

14. The computer program product of claim 11, wherein the program instructions are executable to determine power needs for the computing device.

15. A system comprising:
a processor, a computer readable memory, one or more computer readable storage media, and program instructions collectively stored on the one or more computer readable storage media, the program instructions executable to:
output both a first type of response and a second type of response for each query of plural queries during a learning phase, wherein the first type of response comprises an audio response and the second type of response comprises a displayed response;
determine user interaction patterns with the first type of response and the second type of response during the learning phase;
based on the determined user interaction patterns, determine user preferences including that the user prefers the first type of response for a first query type and that the user prefers the second type of response for a second query type;
awaken a computing device to receive a new query;
receive new query at the computing device;
analyze the query for a context;
determine a query type of the new query from the context;
correlate a response content to the query type;
in response to the query type of the new query being the first query type and based on the user preferences, delivering only an audio response for the new query; and
in response to the query type of the new query being the first query type and based on the user preferences, delivering only a displayed response for the new query.

16. The system of claim 15, further comprising program instructions to reduce a complexity of the response content.

17. The system of claim 15, further comprising program instructions to display the displayed response on an alternate device based on determining a current power level of the computing device is below a power threshold.

18. The system of claim 15, further comprising program instructions to determine a location of the user with respect to the alternate device.

19. The system of claim 15, wherein the determining the user preferences comprises clustering the determined user interaction patterns.

20. The computer program product of claim 11, wherein the determining the user preferences comprises clustering the determined user interaction patterns.

* * * * *